Figure 1:
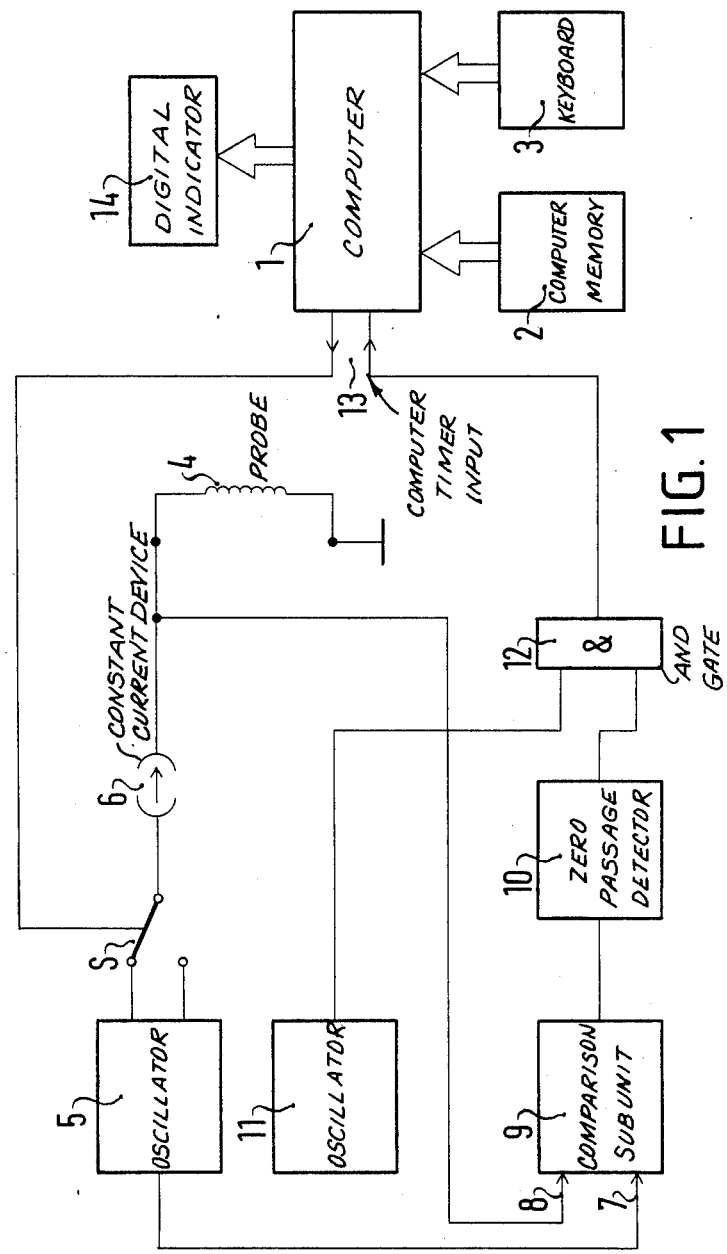

United States Patent [19]

Deutsch et al.

[11] Patent Number: 4,695,797

[45] Date of Patent: Sep. 22, 1987

[54] METHOD OF AND APPARATUS FOR LAYER THICKNESS MEASUREMENT

[75] Inventors: Volker K. Deutsch, Wuppertal; Werner F. Roddeck, Velbert, both of Fed. Rep. of Germany

[73] Assignee: Karl Deutsch Prüf- und Messgerätebau GmbH+Co. KG, Wuppertal, Fed. Rep. of Germany

[21] Appl. No.: 699,667

[22] Filed: Feb. 8, 1985

[30] Foreign Application Priority Data

Feb. 10, 1984 [DE] Fed. Rep. of Germany ....... 3404720

[51] Int. Cl.$^4$ .............................................. G01B 7/10
[52] U.S. Cl. .................................. 324/230; 118/712; 324/202; 324/225; 427/10
[58] Field of Search ............... 324/229, 230, 231, 233, 324/202, 225; 364/563, 571; 427/9, 10; 118/712, 713, 714

[56] References Cited

U.S. PATENT DOCUMENTS

| 3,249,860 | 5/1966 | Huggins | 324/202 X |
| 3,757,208 | 9/1973 | Brunner | 324/230 |
| 3,808,525 | 4/1974 | Ott | 324/230 |
| 4,255,709 | 3/1981 | Zatsepin et al. | 324/229 |

FOREIGN PATENT DOCUMENTS

| 2804678 | 8/1975 | Fed. Rep. of Germany . | |
| 760788 | 10/1956 | United Kingdom | 324/231 |
| 1492411 | 11/1977 | United Kingdom . | |
| 1595682 | 8/1981 | United Kingdom . | |
| 2088062 | 6/1982 | United Kingdom . | |
| 2112944 | 7/1983 | United Kingdom . | |

OTHER PUBLICATIONS

Feinwerktechnik & Messtechnik 89, 1981, No. 6, p. 279.

Primary Examiner—Reinhard J. Eisenzopf
Assistant Examiner—Robert W. Mueller
Attorney, Agent, or Firm—Toren, McGeady

[57] ABSTRACT

A method of and apparatus for measuring the layer of coating thickness of non-magnetic substances on a ferromagnetic parent material by the magneto-inductive method or of non-metallic substances on a conductive parent material by the eddy current method. This is done with the use of a probe whose coil inductance is evaluated as a criterion for the thickness of the layer to be measured. An adjustment to the geometry and the magnetic properties of the specimen are made before the first measurement. In the adjustment, at least one non-magnetic or non-conductive foil is disposed or are consecutively disposed between the probe and the surface of the coated specimen and the measured data obtained then and in the subsequent measurements are fed to a microcomputer. In the semiconductor store of the micro-computer, the non-linear relationship between the coil inductance of at least one probe and the distance between the probe and the parent material is being or has been stored in the form of at least one values table and in which the layer thickness values of the foils are being or have been stored. The microcomputer calculates the thickness values of the layer material from the measurement data fed to it and from the stored data.

20 Claims, 2 Drawing Figures

METHOD OF AND APPARATUS FOR LAYER THICKNESS MEASUREMENT

The invention relates to a method of measuring the layer or coating thickness of non-magnetic substances on a ferromagnetic parent material by the magneto-inductive method or of non-metallic substances on a conductive parent material by the eddy current method. In these methods of measurement, a coil probe is placed on the specimen and the coil inductance is evaluated as a criterion for the thickness of the layer to be measured. An adjustment to the geometry and magnetic properties of the specimen is made before the first measurement.

The invention also relates to a layer thickness measuring device for the practice of the method, the device comprising: an oscillator for energizing the coil of a probe adapted to be placed, either directly or with an intermediate foil on the specimen; a measuring facility for measuring criteria of the inductivity of the coil; an evaluating unit for making an evaluating comparison of these measured data with a zero point value; and a thickness indicator disposed after the evaluating unit.

Devices of this kind have been in use for a considerable time, more particularly, in galvanizing plants, paint shops, metal spray shops, welding and boiler-making concerns (for the inspection of austenitic platings, lead linings and bitumen covering) and in enamelling plants, hot galvanizing plants and similar forms of manufacture in which protective layers are applied to articles.

The corresponding products are used more particularly in the motor vehicle and chemical industries.

The protective layers or platings whose thickness it is required to measure by means of the devices hereinbefore referred to serve mainly for corrosion protection, something which can usually be guaranteed only by a minimum thickness of the surface layer. This requirement conflicts with the cost requirement to apply as little as possible of the often valuable protective material. These conflicting requirements can be harmonized with one another only by accurate measurement of layer thickness. The function of such measurement is therefore to detect the thinnest part of the coating, for only if the required minimum layer thickness is present at the thinnest part can the article resist the intended use without damage. This leads to the need for a single-pole form of layer thickness measurement. The method of working therefore entails using a probe which can be placed on the specimen—i.e., the article to be measured—and which has an a.c. energized coil which represents an open magnetic circuit. Altering the distance between the probe and the surface of the parent material alters the inductance of the probe coil. This phenomenon is used to obtain an accurate measurement of the distance or gap between the probe and the parent material. The presence of non-magnetic or non-conductive layer materials between the probe and the parent material does not affect measurement, and so when the probe is placed on the magnetic layer, the layer thickness can be determined by measurement of the distance between the probe and the parent material.

If accurate measurements are to be possible despite the effect of magnetic or electrical properties of the parent material and of the shape and size of the blank on the measurement, two-point calibration is necessary when working with the known devices. To this end, an uncoated or unlayered blank or a test specimen having identical magnetic or electric properties and an identical shape is required. The probe is first placed on the uncoated article and the thickness indication on the scale of the thickness indicator is adjusted to zero with the aid of an adjustable potentiometer. A foil of known thickness is then placed between the probe and the uncoated surface and the thickness value of the inserted foil is adjusted on the instrument by means of a second controller. The zero point must then be checked again and, if necessary, readjusted. In measurement ranges without a zero point this two-point adjustment must of course be carried out in the same way with two foils of known thickness, the thickness of one foil coming at start of the scale and the thickness of the other in the end part of the scale. If no uncoated material is available, the layer must be removed from parts of the specimen—i.e., the same has to be damaged.

The known devices can operate only with probes of a predetermined size for a predetermined range of layer thicknesses.

The main problem which the invention intends to solve is to render unnecessary the uncoated test specimen or the layer-free surface portion of the specimen which is required for adjustment purposes when measuring with the known devices. A further proposal of the invention is to enable the device to operate with coils of different sizes and in various measurement ranges, so that the device can be used universally in any required range of layer thicknesses.

According to the invention, in the adjustment to the geometry and the material properties of the specimen made before the first measurement, at least one non-magnetic or non-conductive foil of known thickness, but as a rule two or three such foils, is/are placed consecutively between the probe to be used in the subsequent thickness measurements and the surface of the coated specimen. The coil inductance data obtained with each foil in thickness measurements with the same probe are fed to a microcomputer having a semiconductor store. The non-linear relationship between the coil inductance of at least one probe and the distance between said probe and the parent material is stored in the microcomputer store in the form of at least one values table. The layer thickness values of the foils and in adjustment and the coil inductance data obtained with such foils in adjustment are also stored in the microcomputer with respect to the values table belonging to the used probe, the microcomputer calculating the thickness values of the layer material being calculated by a logic unit of said microcomputer from the thickness measurement coil inductance data fed to it and from the stored data.

Correspondingly, in a layer thickness measuring device according to the invention the evaluating unit is a microcomputer in whose semiconductor store the non-linear relationship between the coil inductance of at least one probe and the distance between the probe and the parent material has been or will be stored in the form of at least one values table and in which moreover the layer thickness values of the foils introducible between the probe and the parent material for zero adjustment and the probe coil inductance data obtained with these foils have been or will be stored, the microcomputer comprising a logic unit for calculating the thickness values of the layer materials from the measured coil inductance data fed to it and from the stored data and feeding the calculated values to an indicator unit.

The subclaims disclose other features of the invention.

Figure 2:
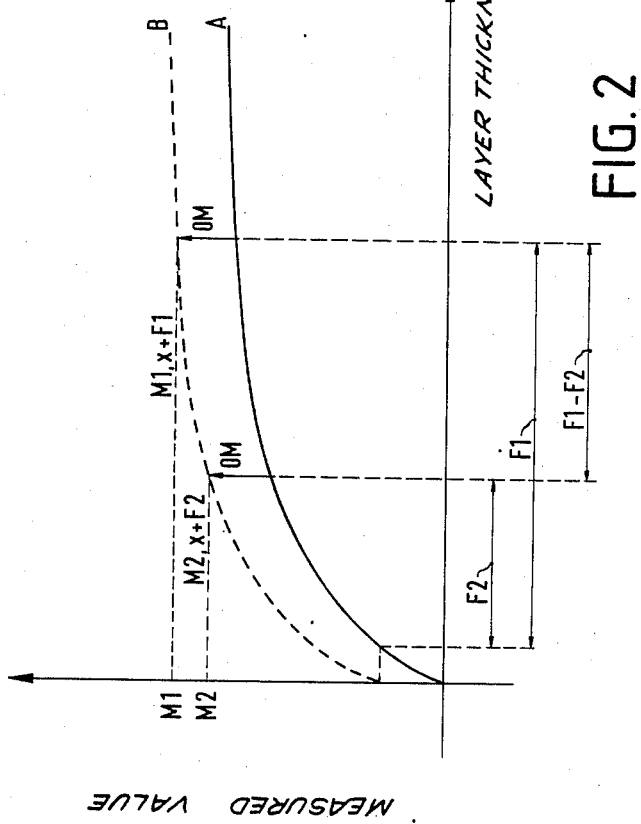

The invention will be described hereinafter with reference to an embodiment illustrated in the drawings wherein:

FIG. 1 is a block schematic diagram of a layer thickness measuring device according to the invention, and FIG. 2 is an illustration in graph form to illustrate the zero or zero point adjustment.

The embodiment shown in FIG. 1 is of a magneto-inductive device in which the measured value evaluated as feature of the change in inductance is derived on the difference between the phases of the current and voltage. The device has a probe 4 whose coil is energized with a sinusoidal voltage, by way of a constant current device 6, from an oscillator 5. The probe 4 when placed on the specimen represents an open magnetic circuit which the variation of the distance between the probe 4 and the magnetic parent material closes to varying extents, the magnetic resistance and, therefore, the inductance of the coil altering. The change in coil inductance causes a phase shift between the current and the voltage. So that probes having coils of different inductance can be used, the frequency of the oscillator 5 can be changed within the appropriate range by the switch S by way of a keyboard 3 of the microcomputer 1.

The measuring facility for determining the inductance criterion of the probe has a subunit 9 in which the cophasal oscillator signal 7 is compared with the phase-shifted current signal 8 of the probe. The resulting measured value, which is a criterion of the extent of the change of inductance, is supplied to a zero passage detector 10. The purpose of this zero passage detector is to produce a window which is proportional to the measured value and whose length is measured by counting pulses of an oscillator 11. The counting pulses go through an and-gate 12 to timer input 13 of the computer 1.

Thickness values F1 and F2 of calibrating foils which are accessories of the device and which are used in its adjustment as inserts are stored in the computer memory 2, and through the agency of the keyboard 3 the thickness values of any foils required to be used as inserts for adjustment can also be stored in the store 2.

The relationship between the inductance of the probe coil or each of a number of probe coils of different sizes and for different ranges of thickness measurements and the distance between the probe 4 and the parent material is stored in the store 2 in the form of one values table or more values tables each of which belongs a coil of certain scope.

Since a number of values tables for different probes can be stored, the device can, in association with the changeover feature of the oscillator 5, operate with probes of different sizes and different coil inductances and can therefore be used to make measurements over the entire range concerned of layer thicknesses. Also, since very small probes can be connected, a device according to the invention can be used to measure the layer thickness of geometrically complicated surfaces or surface zones. The knowwn devices lack these features since they can operate only with probes of one particular size or inductance and can therefore make measurements only within one particular range of layer thicknesses.

Another feature is that variations of the curve A reproduced by the values tables (FIG. 2) as a result of different material properties or geometric effects can be eliminated by using the keyboard 3 to write correction factors relating to material properties or geometric effects into the memory 2, the computer 1 taking these factors into consideration in its calculation of the measured value.

From the counting pulses input by way of the timer input 13 and representing the measured value of coil inductance, and with allowance for the stored values (curve A, possible correction factors therefor, thickness values of the foils used for zero point adjustment), the computer 1 calculates the thickness value x of the layer on the parent material and an indication of such value is given on the digital indicator 14. At least 100 individual measurements are made by the computer 1 for a single measured value output therefrom, the computer averaging out the 100 individual measurements and displaying them on the digital display 14.

For zero point adjustment when using the device according to the invention, two foils of known thicknesses F1 and F2 are first placed on the article having a layer of unknown thickness x which is required to be measured, the probe 4 being placed on the article after each placing of a foil. The coil induction features measured when the probe is placed on the article—i.e., the phase difference between current and voltage in the embodiment illustrated—are processed by the measuring facility 9–12 into counting pulses which are supplied to the computer timer input 13 for evaluation. The computer computes from the counting pulses the measured value M1 and M2 as the measured inductance value for measurements made with the foils of thickness F1 and F2 respectively in position. The thicknesses F1 and F2 are included in the evaluation in that, if calibrating foils of various thicknesses are present as accessories of the device, the values F1, F2 have been stored in the computer store 2. However, any foils of known thickness F1 and F2 can be used, in which event the foil thickness must be written into the store 2 by way of the keyboard 3. The values table, also present in the store 2, for the non-linear relationship between the change in coil inductance and the distance between the probe 4 and the parent material can be illustrated graphically by the curve A of FIG. 2, whose pattern can be affected by the entry of correction data by way of the keyboard 3, as previously stated.

If x is the unknown thickness of the layer to be measured, the measured value M1 corresponds to a probe-to-parent-material distance of x+F1 and the measured value M2 corresponds to the distance x+F2. The difference between M1 and M2 corresponds to the thickness difference F1=F2. Consequently, those points of the curve A which correspond to the values M1 and M2 should be spaced apart from one another along the layer thickness axis of FIG. 2 by a distance corresponding to the thickness difference F1−F2. However, this occurs only if there has been zero point balancing. In the absence thereof—i.e., if those points on curve A which correspond to the values M1 and M2 are not spaced apart from one another along the layer thickness axis of FIG. 2 by a distance corresponding to the values stored for F1 and F2—something which the computer ascertains by comparison—the logic system of the computer 1 causes the values of the stored table to run through a values scale corresponding to a parallel displacement of the curve A along the measured-value axis of FIG. 2 until a values table corresponding to the curve B of FIG. 2, the latter curve being displaced parallel to the curve A, arises in which the two values M1 and M2 are spaced apart from one another along the layer thickness axis by a distance F1−F2, in which case they correspond to a layer thickness value of F1+x and F2+x respectively, so that the computer can calculate the difference value x from this and display it on the digital display 14. This is how zero point adjustment and the first measurement are made. The offset value OV corresponding to the parallel displacement of the curve is automatically allowed for by the computer 1 in each subsequent measurement, so that the further measurements can be made, assuming the same material and the same workpiece geometry, without any further application of foils or similar inserts.

The measured values can be formed by multiple measurement and subsequent statistical averaging in the computer.

Instead of the measured value being derived, as in the embodiment hereinbefore described, from the phase difference between current and voltage, changes in amplitude can be evaluated or a mixed evaluation method can be used.

We claim:

1. A method for measuring a thickness of a layer of non-magnetic material on a ferromagnetic base material specimen in accordance with a magnetic inductive process using a probe having a coil therein, said coil having an inductance which varies with respect to a distance between said coil and a ferromagnetic material, wherein a calibration table is stored for said probe corresponding to a curve A reflecting a non-linear relationship between the coil inductance and the distance between the coil and the magnetic material, characterized in that the method comprises the steps:
    (a) placing a non-magnetic foil having a known thickness on the non-magnetic material layer on the specimen;
    (b) placing the probe on top of said foil;
    (c) measuring the inductance of the coil of the probe;
    (d) storing said measuring coil inductance and the known foil thickness;
    (e) repeating steps (a) through (d) for at least one further foil having a different thickness;
    (f) determining difference values for the above measured coil inductances and the known foil thickness;
    (g) comparing these difference values with the curve A of the stored calibration table;
    (h) generating a curve B offset from said curve A by an amount ov in response to said comparison;
    (i) displaying said offset value ov as an initial measurement for the thickness of said layer on said specimen; and
    (j) storing said offset value ov for use in subsequent measurements of said specimen.

2. A method according to claim 1, wherein said inductance measuring step includes multiply measuring the inductance and forming a statistical average of the multiply measured inductances.

3. A method according to claim 1 or 2, wherein in said inductance measuring step, said coil inductance is derived from a phase difference between a coil current and a coil voltage.

4. A method according to claim 1 or 2, wherein in said inductance measuring step, said coil inductance is derived from an amplitude of a coil current or voltage.

5. A layer thickness measurement device for measuring a thickness of a layer of non-magnetic material on a specimen of ferromagnetic material by a magnetic inductive process, said device comprising:
    an oscillator for energizing a coil of a probe to be placed on the specimen;
    a measuring facility for measuring an inductance of the coil;
    an evaluating unit for an evaluating comparison of the measured coil inductance data with a zero point value; and
    a thickness indicator disposed after the evaluating unit, characterized in that the evaluating unit includes a microcomputer which comprises:
    a memory in which is stored a calibration curve in a values table of the inductances of the coil in relation to various distance between the coil and a magnetic material;
    means for determining a first difference value of measured coil impedances when said specimen includes at least two foils successively placed thereon, said foils being of non-magnetic material and having known thickness, as well as a second difference value of said known thickness;
    means for comparing said first and second difference values with said calibration curve stored in said memory and for determining an offset value from said calibration curve for a curve of said measured coil impedances and said known thickness, in which the distances thereof correspond to the thickness of the layer on the specimen in addition to the known thicknesses of the foils; and
    means for storing said offset value and said determined curve for directly providing thickness data for succeeding measurements of the thickness of the layer on said specimen.

6. A device as claimed in claim 5, wherein said measuring facility makes, for each measurement, a plurality of sub-measurements and said microcomputer performs a statistical averaging of said sub-measurements to form each measurement.

7. A device according to claim 5 or 6, wherein the frequency of the oscillator can be changed over by means of a switch and the microcomputer includes means for producing control signals for such changeover operations, an output of said producing means being connected to a control input of the switch, said producing means being actuatable by a computer keyboard.

8. A device according to claim 5 or 6, including a computer subunit actuatable by a computer keyboard and serving for correction of the values table stored in the memory.

9. A device according to claim 5 or 6, wherein both a current signal of the probe coil and also a cophasal signal of the oscillator are supplied to an input of a subunit of the measuring facility, said subunit comparing the signals with one another and outputting a measured value proportional to a phase shift thereof.

10. A device according to claim 5 or 6, including a zero package detector in the measuring facility for producing a window proportional to a change in probe coil inductance, a length of said window being measured by counting pulses of a further oscillator which are fed via an and-gate to a timer input of the microcomputer.

11. A method for measuring a thickness of a layer of non-metallic material on a conductive base material specimen in accordance with an eddy current process using a probe having a coil therein, said coil having an inductance which varies with respect to a distance between said coil and a conductive material, wherein a calibration table is stored for said probe corresponding to a curve A reflecting a non-linear relationship between the coil inductance and the distance between the coil and the conductive material, characterized in that the method comprises the steps:
- (a) placing a non-metallic foil having a known thickness on the non-metallic layer on the specimen;
- (b) placing the probe on top of said foil;
- (c) measuring the inductance of the coil of the probe;
- (d) storing said measuring coil inductance and the known foil thickness;
- (e) repeating steps (a) through (d) for at least one further foil having a different thickness;
- (f) determining difference values for the above measured coil inductances and the known foil thickness;
- (g) comparing these difference values with the curve A of the stored calibration table;
- (h) generating a curve B offset from said curve A by an amount ov in response to said comparison;
- (i) displaying said offset value ov as an initial measurement for the thickness of said layer on said specimen; and
- (j) storing said offset value ov for use in subsequent measurements of said specimen.

12. A method according to claim 11, wherein said inductance measuring step includes multiply measuring the inductance and forming a statistical average of the multiply measured inductances.

13. A method according to claim 11 or 12, wherein in said inductance measuring step, said coil inductance is derived from a phase difference between a coil current and a coil voltage.

14. A method according to claim 11 or 12, wherein in said inductance measuring step, said coil inductance is derived from an amplitude of a coil current or voltage.

15. A layer thickness measurement device for measuring a thickness of a layer of non-metallic material on a specimen of conductive material by an eddy current process, said device comprising:
- an oscillator for energizing a coil of a probe to be placed on the specimen;
- a measuring facility for measuring an inductance of the coil;
- an evaluating unit for an evaluating comparison of the measured coil inductance data with a zero point value; and
- a thickness indicator disposed after the evaluating unit, characterized in that the evaluating unit includes a microcomputer which comprises:
- a memory in which is stored a calibration curve in a values table of the inductances of the coil in relation to various distance between the coil and a conductive material;
- means for determining a first difference value of measured coil impedances when said specimen includes at least two foils successively placed thereon, said foils being of non-metallic material and having known thickness, as well as a second difference value of said known thickness;
- means for comparing said first and second difference values with said calibration curve stored in said memory and for determining an offset value from said calibration curve for a curve of said measured coil impedances and said known thickness, in which the distances thereof correspond to the thickness of the layer on the specimen in addition to the known thicknesses of the foils; and
- means for storing said offset value and said determined curve for directly providing thickness data for succeeding measurements of the thickness of the layer on said specimen.

16. A device as claimed in claim 15, wherein said measuring facility makes, for each measurement, a plurality of sub-measurements and said microcomputer performs a statistical averaging of said sub-measurements to form each measurement.

17. A device according to claim 15 or 16, wherein the frequency of the oscillator can be changed over by means of a switch and the microcomputer includes means for producing control signals for such changeover operations, an output of said producing means being connected to a control input of the switch, said producing means being actuatable by a computer keyboard.

18. A device according to claim 15 or 16, including a computer subunit actuatable by a computer keyboard and serving for correction of the values table stored in the memory.

19. A device according to claim 15 or 16, wherein both a current signal of the probe coil and also a co-phasal signal of the oscillator are supplied to an input of a subunit of the measuring facility, said subunit comparing the signals with one another and outputting a measured value proportional to a phase shift thereof.

20. A device according to claim 15 or 16, including a zero package detector in the measuring facility for producing a window proportional to a change in probe coil inductance, a length of said window being measured by counting pulses of a further oscillator which are fed via an and-gate to a timer input of the microcomputer.

* * * * *